United States Patent Office 3,634,437
Patented Jan. 11, 1972

3,634,437
3-ARYLOXYALKYLPIPERIDINE DERIVATIVES
Alexander Henry Todd, Macclesfield, England, assignor to Imperial Chemical Industries Limited, London, England
No Drawing. Filed May 19, 1969, Ser. No. 825,934
Claims priority, application Great Britain, June 10, 1968, 27,502/68
Int. Cl. C07d 29/18
U.S. Cl. 260—293.77  18 Claims

ABSTRACT OF THE DISCLOSURE

The disclosure relates to 3-aryloxyalkylperidine derivatives of the formula:

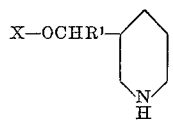

wherein $R^1$ stands for hydrogen or for an alkyl or aryl radical and wherein X stands for an aryl radical which may optionally be substituted, and acid-addition salts thereof, and to a process for the manufacture of said compounds and to pharmaceutical compositions containing them. Representative of the compounds disclosed are 3-phenoxymethylpiperidine and the hydrochloride thereof. The compounds possess thymoleptic and central nervous depresent activity in warm-blooded animals, and may be used in the treatment of depressive illness, anxiety, neurotic states and epilepsy in man.

---

This invention relates to new piperidine derivatives which possess valuable therapeutic properties, for example they possess thymoleptic (anti-depressant) activity in warm-blooded animals as demonstrated by the reversal of reserpine-induced hypothermia in mice, a standard test for thymoleptic activity, and these compounds are therefore useful in the treatment or prophylaxis of depressive illness in man. Furthermore, some of the compounds also possess depressant action on the central nervous system of warm-blooded animals as demonstrated by the reduction of spontaneous motility of mice and the prevention of electroshock-induced convulsions in mice, both standard tests for central nervous depressant activity, and they are therefore useful in the treatment of anxiety, neurotic states and epilepsy in man. Some of the compounds also possess anorexiant activity.

According to the invention we provide new piperidine derivatives of the formula:

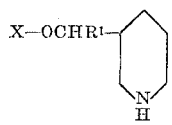

wherein $R^1$ stands for hydrogen or for an alkyl or aryl radical, and wherein X stands for an aryl radical which may optionally be substituted, and the acid-addition salts thereof.

It is to be understood that the above definition of piperidine deirvatives encompasses all possible stereoisomers thereof, and mixtures thereof.

As a suitable value for $R^1$ when it stands for an alkyl radical there may be mentioned, for example, an alkyl radical of up to 5 carbon atoms, for example the methyl radical.

As a suitable value for $R^1$ when it stands for an aryl radical there may be mentioned, for example, an aryl radical of up to 10 carbon atoms, for example the phenyl radical.

As a suitable value for X there may be mentioned, for example, a phenyl or naphthyl radical which may optionally be substituted by one or more, for example one or two, substituents selected from alkyl and alkoxy radicals, for example alkyl and alkoxy radicals each of up to 5 carbon atoms, for example methyl, ethyl, isopropyl, n-butyl, t-butyl, t-amyl, methoxy, ethoxy, isopropoxy, n-butoxy and isobutoxy radicals; hydroxyalkyl radicals, for example hydroxyalkyl radicals of up to 5 carbon atoms, for example hydroxymethyl and 1-hydroxyethyl radicals; aryl radicals, for example aryl radicals of up to 10 carbon atoms, for example phenyl radicals; acylamino radicals, for example alkanoylamino radicals of up to 6 carbon atoms, for example acetamido and hexanamido radicals; hydroxy radicals; methylenedioxy radicals; and alkylene radicals, for example alkylene radicals of 3 or 4 carbon atoms, for example trimethylene and tetramethylene radicals (that is, those radicals which, together with the aryl radical X, form an indanyl or tetrahydronaphthyl radical, for example the 4-indanyl, 5-indanyl, 5,6,7,8-tetrahydro-1-naphthyl or 5,6,7,8-tetrahydro-2-naphthyl radical). Preferably the phenyl or naphthyl radical X is unsubstituted or bears a single substituent selected from those defined above.

As suitable acid-addition salts of the piperidine derivatives of the invention there may be mentioned, for example, salts derived from an inorganic or organic acid, for example hydrochlorides, hydrobromides, phosphates, sulphates, oxalates, lactates, tartrates, acetates, salicylates, citrates, benzoates, β-naphthoates, adipates or 1,1-methylene-bis-(2-hydroxy-3-naphthoates), or acid-addition salts derived from acidic synthetic resins, for example sulphonated polystyrene resins, for example "Zeo-Karb" 225 ("Zeo-Karb" is a trademark).

Particular new piperidine derivatives of the invention are 3-phenoxymethyl-,
3-(o-ethoxyphenoxymethyl)-,
3-(m-methoxyphenoxymethyl)-,
3-(naphth-1-yloxymethyl)-,
3-(o-phenylphenoxymethyl)-,
3-(m-tolyloxymethyl)-,
3-(o-tolyloxymethyl)-,
3-(o-ethylphenoxymethyl)-,
3-(o-hydroxymethylphenoxymethyl),
3-(p-phenylphenoxymethyl)-,
3-(o-hydroxyphenoxymethyl)-,
3-(4-indanyloxymethyl)-,
3-(1,3-benzodioxol-5-yloxymethyl)-,
3-(p-acetamidophenoxymethyl)-,
3-α-phenoxybenzyl- and
3-α-phenoxyethyl-piperidine and the acid-addition salts thereof. Of these, preferred compounds are 3-phenoxymethylpiperidine and the hydrochloride thereof.

According to a further feature of the invention we provide a process for the manufacture of the piperidine derivative of the invention which comprises the reduction of a pyridine derivative of the formula:

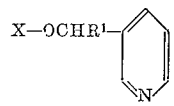

wherein $R^1$ and X have the meanings stated above, or of an acid-addition salt or an N-benzyl quaternary salt thereof.

A suitable acid-addition salt of the pyridine derivative is, for example, a hydrohalide, for example the hydrochloride, and a suitable N-benzyl-pyridinium salt is, for example, a halide, for example the chloride.

The reduction may be carried out by means of hydrogen in the presence of a catalyst, for example a platinum catalyst, or by means of sodium and ethanol, or tin and aqueous hydrochloric acid, or sodium or aluminium amalgam and water, as reducing agent.

Alternatively, when an N-benzyl-pyridinium salt is used as starting material, the reduction may be effected by a two-stage process, whereby the N-benzyl-pyridinium salt is first reduced by means of a complex metal hydride, for example an alkali metal borohydride, for example sodium borohydride, to an N-benzyl-tetrahydropyridine derivative, whereafter the N-benzyl-tetrahydropyridine derivative or an acid-addition salt thereof is further reduced to the desired piperidine derivative, for example by means of hydrogen in the presence of a catalyst, for example platinum.

The pyridine derivative used as starting material may be obtained by the interaction of a halogeno-pyridine derivative of the formula:

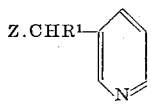

wherein $R^1$ has the meaning stated above, and wherein Z stands for a halogen atom, for example the chlorine atom, with a compound of the formula X—OH, wherein X has the meaning stated above, optionally followed by acid-addition salt or quaternary salt formation.

The halogeno-pyridine derivative may be obtained by the halogenation of a 3-alkylpyridine, as generally described by Arnall and Clark in "Manufacturing Chemist and Aerosol News," July 1966, page 39; or by the interaction of a hydroxyalkyl-pyridine derivative of the formula:

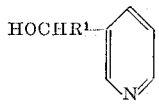

wherein $R^1$ has the meaning stated above, with a halogenating agent, for example thionyl chloride.

According to a further feature of the invention we provide pharmaceutical compositions which comprise as active ingredient at least one of the piperidine derivatives of the invention, or an acid-addition salt thereof, in association with a pharmaceutically-acceptable diluent or carrier therefor.

The pharmaceutical compositions may be, for example, in a form suitable for oral or parenteral administration, for which purposes they may be formulated by means known to the art into the form of, for example, tablets, capsules, aqueous or oily solutions or suspensions, emulsions, injectable aqueous or oily solutions or suspensions, or dispersible powders.

The pharmaceutical compositions of the invention may also contain, in addition to the piperidine derivative or acid-addition salt thereof, one or more known drugs selected from neuroleptic agents, for example chlorpromazine, prochlorperazine, trifluoperazine and haloperidol; other sedative drugs and tranquillizers, for example chlordiazepoxide, phenobarbitone and amylobarbitone; anticonvulsant drugs, for example primidone and phenytoin; β-adrenergic blocking agents, for example propranolol; drugs used in the treatment of Parkinson's disease, for example benzhexol; and other antidepressant drugs, for example imipramine, desipramine, amitriptyline, nortriptyline, drugs of the amphetamine type and monoamineoxidase inhibitors, for example phenelzine and mebanazine.

Preferred pharmaceutical compositions of the invention are those suitable for oral administration in unit dosage form, for example tablets and capsules, which contain between 10 and 100 mg. of active ingredient.

The pharmaceutical compositions of the invention will normally be administered to man, both for the treatment of anxiety and neurotic states and for the treatment of prophylaxis of depressive illness, at such a dose that each patient receives a total of between 5 and 400 mg. of active ingredient per day, and preferably, if a highly active compound is used, a total of between 10 and 100 mg. per day, the composition being administered 3 or 4 times per day.

The invention is illustrated but not limited by the following examples:

EXAMPLE 1

A solution of 1.0 g. of 3-phenoxymethylpyridine hydrochloride in 50 ml. of ethanol is shaken with 0.1 g. of platinum oxide catalyst in an atmosphere of hydrogen at ambient temperature and atmospheric pressure until the uptake of hydrogen ceases. The mixture is filtered and the filtrate is evaporated to dryness. The residue is crystallised from a mixture of methanol and ethyl acetate, and there is thus obtained 3-phenoxymethylpiperidine hydrochloride, M.P. 184.5–186.5° C.

The 3-phenoxymethylpyridine hydrochloride used as a starting material may be obtained as follows:

4.7 g. of phenol are added to a stirred solution of 1.15 g. of sodium in 25 ml. of ethanol. There is then added a solution of 4.1 g. of 3-chloromethylpyridine hydrochloride in 20 ml. of ethanol and the mixture is stirred and heated under reflux for 5 hours. The mixture is cooled and filtered and the filtrate is evaporated to dryness. The residue is partitioned between water and chloroform and the chloroform layer is separated, washed twice with 10% aqueous sodium hydroxide solution and once with water, dried, and evaporated to dryness. The residue is dissolved in ethyl acetate and an ethereal solution of hydrogen chloride is added until precipitation of solid is complete. The mixture is filtered and the solid residue is crystallised from a mixture of methanol and ether. There is thus obtained 3-phenoxymethylpyridine hydrochloride, M.P. 115–119° C.

EXAMPLE 2

The process described in Example 1 is repeated except that the appropriately substituted phenol or naphthol is used in place of unsubstituted phenol. There are thus obtained the following 3-aryloxymethylpiperidine derivatives:

| Aryloxy group: | M.P. of hydrochloride (° C.) |
|---|---|
| o-Ethoxyphenoxy | 129–130 |
| m-Tolyloxy | 159–161 |
| m-Methoxyphenoxy | 190–192 |
| Naphth-1-yloxy | 240–242 |
| o-Phenylphenoxy | 186–188 |

The intermediate 3-aryloxymethylpyridine derivatives in most cases are used without purification and have not been characterised. 3-(o - ethoxyphenoxymethyl)pyridine hydrochloride however melts at 152–155° C.

EXAMPLE 3

The process described in the first part of Example 1 is repeated except that the appropriately substituted 3-phenoxymethylpyridine hydrochloride is used as starting material in place of the 3-phenoxymethylpyridine hydrochloride. There are thus obtained the following 3-aryloxymethylpiperidine derivatives:

| Aryloxy group: | M.P. of hydrochloride (° C.) |
|---|---|
| o-Tolyloxy | 158–160 |
| o-Ethylphenoxy | 149–153 |
| o-Hydroxymethylphenoxy | 105–108 |
| 4-indanyloxy | 199–201 |
| 1,3-benzodioxol-5-yloxy | 208–209 |
| p-Phenylphenoxy [1] | 244–246 |

[1] 3-(p-phenylphenoxymethyl)pyridine starting material used in free base form and not as hydrochloride.

The 3-(o-tolyloxymethyl)pyridine hydrochloride used as starting material may be obtained as follows:

Sodium hydride (3.8 g. of a 50% dispersion in oil) is added gradually to a stirred solution of 4.3 g. of o-cresol in 25 ml. of dry dimethylformamide, the temperature of the mixture being kept between 5 and 10° C. The mixture is allowed to warm to ambient temperature and a solution of 6.6 g. of 3-chloromethylpyridine hydrochloride in 25 ml. of dry dimethylformamide is added, the temperature being allowed to rise to 55° C. The mixture is then heated at 110° C. for one hour and at 140° C. for a further one hour, and is cooled and filtered. The filtrate is evaporated to dryness under reduced pressure and the residue is extracted with ether. The ethereal extract is washed successively with water, aqueous 2 N-sodium hydroxide solution and water, dried over magnesium sulphate and acidified with excess ethereal hydrogen chloride solution. The mixture is filtered and the solid product is crystallised from isopropanol. There is thus obtained 3-(o-tolyloxymethyl)pyridine hydrochloride, M.P. 168–169° C.

The other 3-aryloxymethylpyridine derivatives used as starting materials may be obtained either as described above or as described in the second part of Example 1. The following 3-aryloxymethylpyridine derivatives have been characterised:

| Aryloxy group | Salt or base | M.P.(°C.) |
| --- | --- | --- |
| o-Ethylphenoxy | {Hydrochloride | 120 |
|  | {Monohydrate | 130–134 |
| 4-indanyloxy | Hydrochloride | 192–194 |
| 1,3-benzodioxol-5-yloxy | do | 186–188 |
| p-Phenylphenoxy | Base | 116 |

EXAMPLE 4

A solution of 3 g. of 3-(o-benzyloxyphenoxymethyl)pyridine (prepared by a similar process to that described in the second part of Example 1) in a mixture of 40 ml. of methylated spirit, 10 ml. of water and 5 ml. of concentrated hydrochloric acid is shaken with hydrogen in the presence of 0.5 g. of platinum oxide catalyst at ambient temperature and atmospheric pressure until uptake of hydrogen ceases. The mixture is filtered and the filtrate is evaporated to dryness under reduced pressure. The residue is crystallised from a mixture of methanol and ether and there is thus obtained 3-(2-hydroxyphenoxymethyl)piperidine hydrochloride, M.P. 204–205° C., the benzyloxy radical being converted into the hydroxy radical during the reaction.

EXAMPLE 5

A solution of 1.7 g. of 3-(p-acetamidophenoxymethyl)pyridine hydrochloride (M.P. 230–232° C., prepared by a similar process to that described in the second part of Example 1) in a mixture of 83.3 ml. of ethanol and 16.7 ml. of water is shaken with 0.5 g. of platinum oxide catalyst in an atmosphere of hydrogen at ambient temperature and atmospheric pressure until the uptake of hydrogen ceases. The mixture is filtered and the filtrate is evaporated to dryness. The residue is dissolved in water and the solution is made alkaline with aqueous sodium hydroxide solution. The precipitated solid is filtered off and crystallised from ethyl acetate. There is thus obtained 3-(acetamidophenoxymethyl)-piperidine, M.P. 162–164° C.

EXAMPLE 6

A solution of 29.8 g. of ($\pm$)-3-$\alpha$-phenoxybenzylpyridine hydrochloride hemihydrate in a mixture of 400 ml. of ethanol and 4.6 ml. of aqueous 11 N-hydrochloric acid is shaken with 2.0 g. of platinum oxide in an atmosphere of hydrogen at ambient temperature and atmospheric pressure until absorption of hydrogen ceases. The mixture is filtered and the filtrate is evaporated to dryness. The residue is dissolved in water and the solution is basified with aqueous sodium hydroxide solution and then extracted with ethyl acetate. The ethyl acetate extract is shaken with dilute aqueous hydrochloric acid and the aqueous phase is separated, basified and then extracted with ethyl acetate. The extract is dried over anhydrous sodium sulphate and evaporated to dryness. The residual oil is fractionally distilled and the fraction having B.P. 150–163° C./0.01 mm. is collected. This oil is treated with light petroleum and the solid which separates is filtered off and crystallised from light petroleum (B.P. 60–80° C.). There is thus obtained ($\pm$)-3-$\alpha$-phenoxybenzylpiperidine, as a mixture of two racemates, M.P. 106–116° C.

The ($\pm$)-3-$\alpha$-phenoxybenzylpyridine hydrochloride hemihydrate used as starting material may be obtained as follows:

A solution of 200 g. of 3-benzoylpyridine in 1,200 ml. of ethanol is stirred at 5–10° C., while 15.3 g. of sodium borohydride is added in portions during 30 minutes. The mixture is stirred at 10° C. for 1 hour and then at ambient temperature for 22 hours. 200 ml. of glacial acetic acid are added cautiously at 5–10° C. and the mixture is concentrated under reduced pressure to a small volume. 750 ml. of water and 750 ml. of chloroform are added and the stirred mixture is treated at 10° C. with 40% w./v. aqueous potassium hydroxide solution until the pH of the mixture is 12. The chloroform phase is separated, dried with anhydrous potassium carbonate and evaporated to dryness, and the residue is crystallised from ether. There is thus obtained ($\pm$)-3-$\alpha$-hydroxybenzylpyridine, M.P. 64–66° C. The corresponding hydrochloride has M.P. 150–151° C.

A mixture of 124.0 g. of thionyl chloride and 450 ml. of chloroform is added dropwise to a stirred solution of 161.0 g. of ($\pm$)-3-$\alpha$-hydroxybenzylpyridine in 1,750 ml. of dry chloroform which is maintained at 0° C. When the addition is complete the mixture is heated under reflux for 5 hours and then concentrated under reduced pressure to half of its original volume. Ether is added until precipitation of solid is complete, and the mixture is filtered. The solid product is crystallised from a mixture of ethyl acetate and light petroleum, and there is thus obtained ($\pm$)-3-$\alpha$-chlorobenzylpyridine hydrochloride, M.P. 145–146° C.

A solution of 56.4 g. of phenol in 300 ml. of dry dimethylformamide is added dropwise to a well-stirred mixture of 500 ml. of dimethylformamide and 28.8 g. of a 50% dispersion of sodium hydride in mineral oil which is cooled to 0° C. The mixture is stirred at 0° C. for 30 minutes, and a suspension of 72.0 g. of ($\pm$)-3-$\alpha$-chlorobenzylpyridine hydrochloride in 300 ml. of dimethylformamide is added dropwise. The mixture is stirred and heated under reflux for 18 hours and then cooled to ambient temperature. 30 ml. of aqueous 11 N-hydrochloric acid are added and the mixture is evaporated to dryness under reduced pressure. The residue is mixed with 400 ml. of water and 30 ml. of aqueous 11 N-hydrochloric acid are added. The resulting two-phase liquid mixture is shaken three times with ether, and the ethereal extracts are discarded. After the third extraction a solid separates from the aqueous phase. The solid is filtered off and crystallised from acetone. There is thus obtained ($\pm$)-3-$\alpha$-phenoxybenzylpyridine hydrochloride hemihydrate, M.P. 98–105° C.

EXAMPLE 7

A stirred solution of 49.0 g. of ($\pm$)-1-benzyl-3-$\alpha$-phenoxyethylpyridinium chloride in 500 ml. of methanol is cooled to a temperature of between —10 and —5° C., and is treated portionwise with 15.2 g. of sodium borohydride. The mixture is kept for 1 hour at 0° C. and for 18 hours at ambient temperature, and then evaporated to dryness under reduced pressure. The residue is treated with 100 ml. of a mixture of ice and water, and the mixture is extracted with ether. The extract is dried with anhydrous potassium carbonate and evaporated to dryness and the residual oil is fractionally distilled. Low-boiling fractions are discarded and the fraction having B.P. 126–158° C./0.07–0.09 mm. is collected.

A solution of 11.8 g. of the collected fraction in a mixture of 120 ml. of ethanol and 5.0 ml. of aqueous 11 N-hydrochloric acid is shaken with 6.0 g. of 5% palladium-on-carbon in an atmosphere of hydrogen at atmospheric pressure and ambient temperature until absorption of hydrogen ceases. The catalyst is filtered off and the filtrate is evaporated to dryness. The residue is mixed with water and the mixture is acidified with aqueous 11 N-hydrochloric acid, and then washed with ether. The aqueous phase is basified at 0° C. with 50% w./v. aqueous potassium hydroxide solution and the resulting emulsion is extracted with chloroform. The chloroform extract is dried with anhydrous potassium carbonate and evaporated to dryness and the oily residue is fractionally distilled through a Vigreux column. Early fractions contain 3-ethylpiperidine, B.P. 39–42° C./20 mm. and are discarded, and there is also obtained (±)-3-α-phenoxyethylpiperidine, B.P. 82–85° C./0.003 mm. which is a mixture of two racemates.

The corresponding monooxalate has M.P. 100–103° C. and the corresponding 3,5-dinitrobenzoate has M.P. 139–142° C.

The (±)-1-benzyl-3-α-phenoxyethylpyridinium chloride used as starting material may be obtained as follows:

A solution of 100 g. of 3-acetylpyridine in 600 ml. of ethanol is cooled to 10° C., and to it is added 12.0 g. of sodium borohydride in portions over a period of 1 hour. The mixture is kept at 0° C. for 1 hour and at ambient temperature for 20 hours, and is then cooled to 10° C. 25 ml. of glacial acetic acid are added dropwise, and the mixture is diluted with 200 ml. of water and evaporated to a small volume under reduced pressure. 200 ml. of water are added to the residue and the mixture is basified at 15° C. to pH 12 with 40% w./v. aqueous potassium hydroxide solution. The resulting emulsion is extracted with chloroform and the extract is washed with saturated sodium chloride solution, dried with anhydrous potassium carbonate and evaporated to dryness. The residual oil is distilled, and there is thus obtained (±)-3-α-hydroxyethylpyridine, B.P. 100.5–102° C./1.0–1.4 mm.

A solution of 93.0 g. of thionyl chloride in 500 ml. of dry ether is added dropwise during 3.5 hours to a stirred solution of 87.3 g. of (±)-3-α-hydroxyethylpyridine in 500 ml. of dry ether which is cooled to 0° C. The mixture is kept at 0° C. for 2 hours and at ambient temperature for 18 hours and is then heated under reflux for 20 minutes. The mixture is cooled to 0° C. and filtered and the solid residue is dissolved in 400 ml. of a mixture of ice and water. The solution is washed with ether, cooled to 0–5° C., and treated with solid potassium carbonate in portions until the pH of the solution is between 10 and 11. The resulting emulsion is extracted with chloroform and the extract is dried with potassium carbonate and evaporated to dryness under reduced pressure below 30° C. The residual oil is distilled, and there is thus obtained (±)-3-α-chloroethylpyridine, B.P. 46–48° C./0.4 mm. This material is not stable at ambient temperature, but can be kept in a refrigerator, preferably at −20° C.

A stirred mixture of 500 ml. of dry dimethylformamide and 46.4 g. of a 50% dispersion of sodium hydride in mineral oil is maintained under an atmosphere of nitrogen at 0° C., and a solution of 91.1 g. of phenol in 500 ml. of dry dimethylformamide is added dropwise. When the addition is complete the mixture is stirred at 60° C. for 30 minutes and then cooled to ambient temperature. A solution of 137.0 g. of (±)-3-α-chloroethylpyridine in 500 ml. of dry dimethylformamide is added and the mixture is heated under reflux for 18 hours, cooled and filtered. The solid residue is washed with benzene, and the combined filtrate and washings are treated below 10° C. with 300 ml. of aqueous 5 to 6 N-hydrochloric acid. Charcoal is added, the mixture is filtered, and the filtrate is evaporated to dryness under reduced pressure. A mixture of the residual oil and 600 ml. of water is washed with ether and then basified below 15° C. with 40% w./v. aqueous potassium hydroxide solution. The resulting emulsion is extracted with chloroform and the extract is dried with potassium carbonate and evaporated to dryness. The residual oil is fractionally distilled, and after a low-boiling fore-run there is obtained (±)-3-α-phenoxyethylpyridine, B.P. 106–108° C./0.003 mm. The corresponding dimorphic picrate was two melting points of 93–94° C. and 117–118° C.

A solution of 19.9 g. of (±)-3-α-phenoxyethylpyridine and 12.6 g. of benzyl chloride in 40 ml. of acetonitrile is stirred at ambient temperature for 18 hours, heated under reflux for 1 hour, cooled, and poured with stirring into 400 ml. of ether. The ethereal solution is decanted from the precipitated oil and the oil is washed with ether by decantation and then freed from solvent under reduced pressure. The residual oil solidifies and is crystallised from a mixture of n-propanol and ether. There is thus obtained (±) - 1 - benzyl - 3 - α - phenoxyethylpyridinium chloride, M.P. 149–151° C.

What is claimed is:

1. A piperidine derivative selected from compounds of the formula:

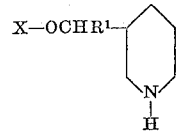

wherein $R^1$ stands for hydrogen, methyl or phenyl, and wherein X stands for phenyl or naphthyl or phenyl or naphthyl which bears one alkyl or alkoxy each of up to 5 carbon atoms, hydroxymethyl, 1-hydroxyethyl, phenyl, alkanoyl of up to 6 carbon atoms, hydroxy or methylenedioxy substituent, or wherein X is indanyl or tetrahydronaphthyl, and the nontoxic, pharmaceutically-acceptable acid-addition salts thereof.

2. A piperidine derivative according to claim 1 wherein $R^1$ stands for hydrogen or for the methyl or phenyl radical, and wherein X stands for a phenyl or naphthyl radical which is unsubstituted or which bears one substituent selected from methyl, ethyl, isopropyl, n-butyl, t-butyl, t-amyl, methoxy, ethoxy, isopropoxy, n-butoxy, isobutoxy, hydroxymethyl, 1-hydroxyethyl, phenyl, acetamido, hexanamido, hydroxy, methylenedioxy or wherein X is indanyl or tetrahydronaphthyl, trimethylene and tetramethylene radicals, and the non-toxic, pharmaceutically-acceptable acid-addition salts thereof.

3. A compound selected from 3-phenoxymethylpiperidine and the non-toxic, pharmaceutically acceptable, acid-addition salts thereof.

4. A compound according to claim 1 selected from 3-(o-ethoxyphenoxymethyl)piperidine and the non-toxic, pharmaceutically-acceptable acid-addition salts thereof.

5. A compound according to claim 1 selected from 3-(m-methoxyphenoxymethyl)piperidine and non-toxic, pharmaceutically-acceptable acid-addition salts thereof.

6. A compound according to claim 1 selected from 3-(naphth-1-yloxymethyl)piperidine and non-toxic, pharmaceutically-acceptable acid-addition salts thereof.

7. A compound according to claim 1 selected from 3 - (o - phenylphenoxymethyl)piperidine and non-toxic, pharamceutically-acceptable acid-addition salts thereof.

8. A compound according to claim 1 selected from 3-(m-tolyloxymethyl)piperidine and non-toxic, pharmaceutically-acceptable acid-addition salts thereof.

9. A compound according to claim 1 selected from 3-(o-tolyloxymethyl)piperidine and non-toxic, pharmaceutically-acceptable acid-addition salts thereof.

10. A compound according to claim 1 selected from 3-(o-ethylphenoxymethyl)piperidine and non-toxic, pharmaceutically-acceptable acid-addition salts thereof.

11. A compound according to claim 1 selected from 3 - (p - phenylphenoxymethyl)piperidine and non-toxic, pharmaceutically-acceptable acid-addition salts thereof.

12. A compound according to claim 1 selected from 3 - (o - hydroxyphenoxymethyl)piperidine and non-toxic, pharmaceutically-acceptable acid-addition salts thereof.

13. A compound according to claim 1 selected from 3-(4-indanyloxymethyl)piperidine and non-toxic, pharmaceutically-acceptable acid-addition salts thereof.

14. A compound according to claim 1 selected from 3 - (1,3 - benzodioxol-5-yloxymethyl)piperidine and non-toxic, pharmaceutically-acceptable acid-addition salts thereof.

15. A compound according to claim 1 selected from 3 - (p-acetamidophenoxymethyl)piperidine and non-toxic, pharmaceutically-acceptable acid-addition salts thereof.

16. A compound according to claim 1 selected from 3 - α-phenoxybenzylpiperidine and non-toxic, pharmaceutically-acceptable acid-addition salts thereof.

17. A compound according to claim 1 selected from 3-α-phenoxyethylpiperidine and non-toxic, pharmaceutically-acceptable acid-addition salts thereof.

18. An acid-addition salt as claimed in claim 1 which is a hydrochloride.

References Cited
UNITED STATES PATENTS 2,075,359   3/1937   Salzberg et al. _____ 424—250

HENRY R. JILES, Primary Examiner

S. D. WINTERS, Assistant Examiner

U.S. Cl. X.R.

260—297 R, 290 HL, 293.62, 293.83, 293.77; 424—267